US005520546A

United States Patent [19]
Klinger et al.

[11] Patent Number: 5,520,546
[45] Date of Patent: May 28, 1996

[54] VALVE BLOCK UNIT

[75] Inventors: Herbert Klinger, Nuremberg; Hartmut Zoebl, Fuerth; Reinhard Fassel, Oberasbach, all of Germany

[73] Assignee: Robert Bosch GmbH, Stuttgart, Germany

[21] Appl. No.: 251,996

[22] Filed: Jun. 1, 1994

[30] Foreign Application Priority Data

Jun. 3, 1993 [DE] Germany .................. 43 18 420.0

[51] Int. Cl.$^6$ ................................ H01R 13/453
[52] U.S. Cl. ........................ 439/140; 303/119.2
[58] Field of Search ................ 439/34, 140, 141; 303/119.1, 119.2

[56] References Cited

U.S. PATENT DOCUMENTS

| | | | |
|---|---|---|---|
| 3,167,373 | 1/1965 | Kostich | 439/140 |
| 5,040,853 | 8/1991 | Burgdorf et al. | 303/119.2 |
| 5,137,455 | 8/1992 | Moerbe et al. | 439/34 |
| 5,222,907 | 6/1993 | Katabuchi | 439/140 |
| 5,275,478 | 1/1994 | Schmitt et al. | 303/119.2 |

FOREIGN PATENT DOCUMENTS

| | | |
|---|---|---|
| 238801 | 9/1987 | European Pat. Off. . |
| 499670 | 8/1992 | European Pat. Off. ............ 303/119.2 |
| 3813138 | 11/1989 | Germany . |
| 91/10583 | 7/1991 | WIPO . |

*Primary Examiner*—Neil Abrams
*Attorney, Agent, or Firm*—Edwin E. Greigg; Ronald E. Greigg

[57] ABSTRACT

A valve block unit comprising a valve block and a valve block lid is proposed, which to facilitate installation and to protect electrical contact pins against bending or damage is equipped with an intermediate plate that has guide openings. In a dismounted state of the valve block and valve block lid, this intermediate plate protectively receives the contact pins. The intermediate plate is subject to the force of compression springs, which are compressed when the valve block and the valve block lid are brought together for installation. The contact pins then protrude from the protective intermediate plate and enter the contact bushes intended for them. This assures safe electrical connections, designed for ease of manufacture, within the valve block unit. The valve block unit is intended for use in motor vehicle brake pressure modulation systems.

17 Claims, 2 Drawing Sheets

VALVE BLOCK UNIT

BACKGROUND OF THE INVENTION

The invention is based on a valve block unit as defined hereinafter. A valve block unit of this kind is known (German Patent Application DE 38 13 138 A1, U.S. Pat. No. 5,137,455).

In such valve block units, the problem exists that before or during the installation of a valve block lid, together with switch means secured to it or in it, the freely protruding contact pins, contact knives or the like become bent or damaged. In that case, they fail to meet their counterpart element, so that valve block units are then installed improperly if at all and are therefore defective from the very outset.

It is known from European Patent Disclosure EP 0 238 801 A1 to perform precentering of a multipole plug connection. However, such precentering, alone, is not sufficient for reliable contacting, especially because it does not protect the contact pins or contact knives from being bent or damaged.

OBJECT AND SUMMARY OF THE INVENTION

The object of the invention is to avoid these disadvantages and to create a valve block unit in which the contact pins or contact knives or similar contact elements are protected against being bent or damaged when the valve block unit is not yet installed or has been removed or in other words dismounted. Moreover, automatic installation of the valve block unit of the kind that is usually in mass production should be assured.

According to the invention, in the valve block unit as defined above, this object is attained by the characteristics set forth hereinafter.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 2:
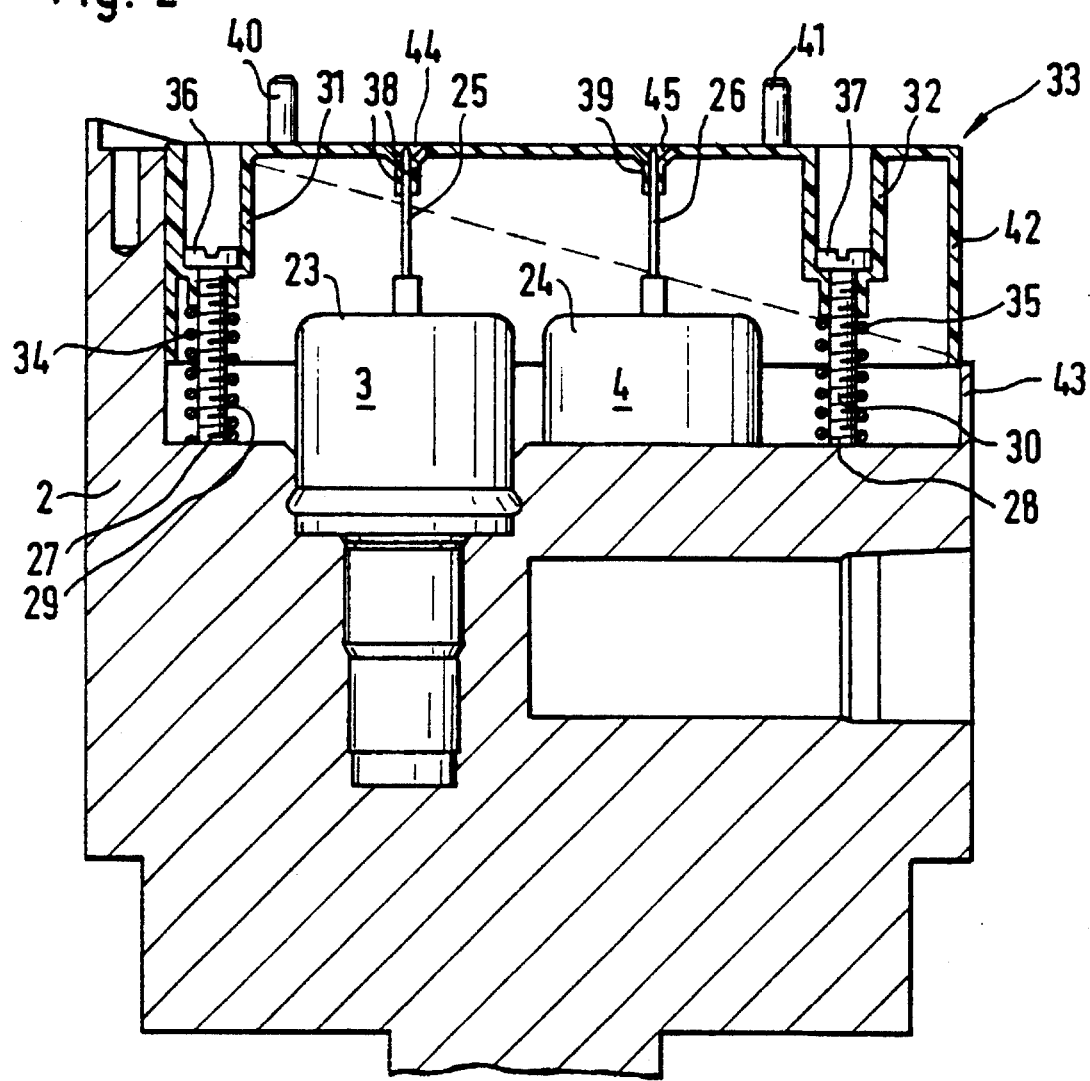
FIG. 2 is a section diagram of the valve block with magnet valves, both views being in the dismounted or uninstalled state of the unit.
Figure 3:
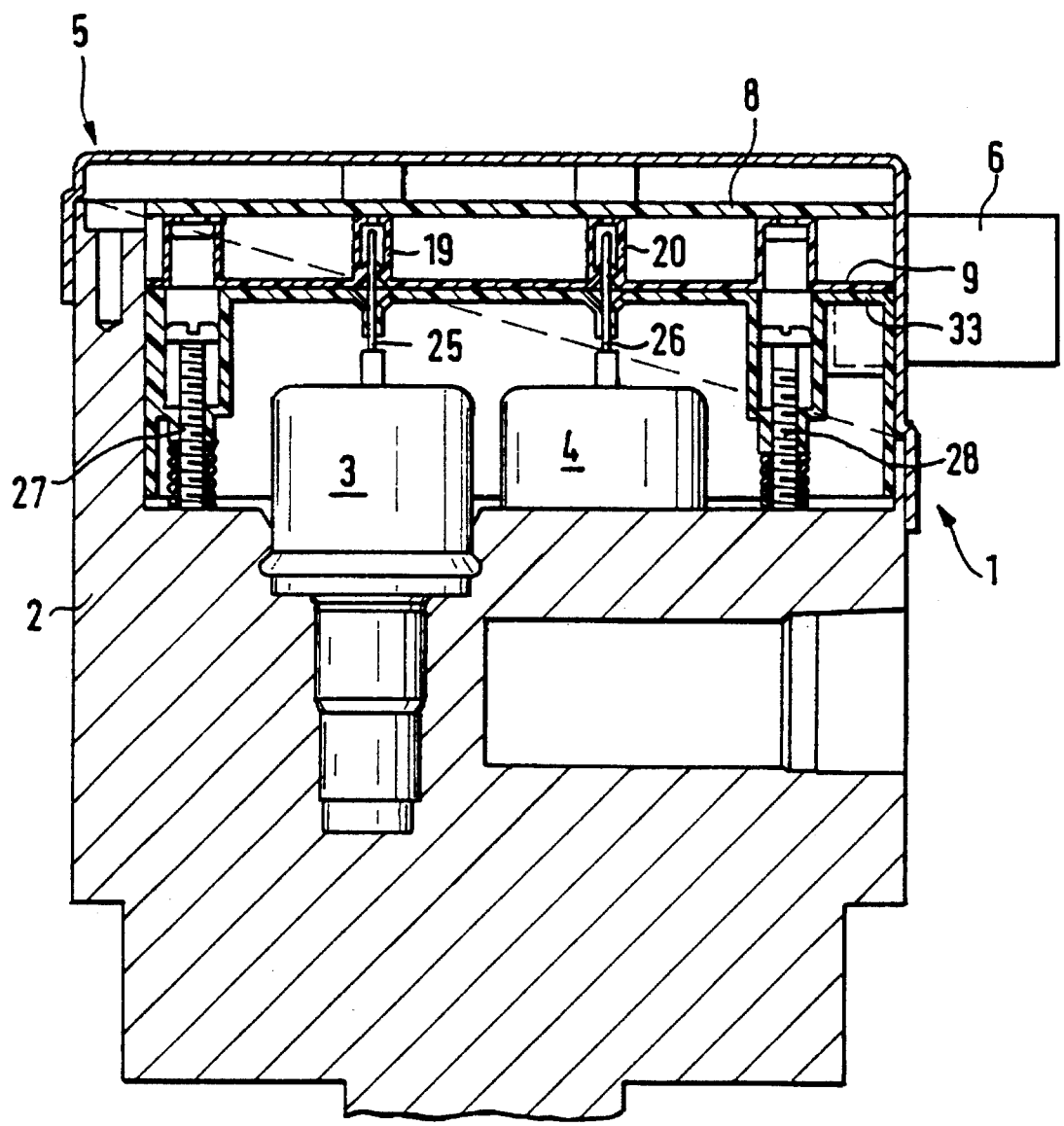
FIG. 3 shows the valve block unit in the state after its mounting or installation.

A valve block unit 1 comprises a valve block 2 for a number of magnet valves, only two of which can be seen in FIGS. 2 and 3, specifically the magnet valves 3 and 4, and a valve block lid 5, to which a multiplug power strip or electronic switch gear 6 is secured. The valve block unit 1 is intended for use in brake pressure regulating systems, of the kind employed in anti-lock brake systems (ABS) and/or traction control systems (ASR).

The valve block lid 5 comprises a hood 7, in which an electric printed wiring board 8 and spaced apart from and below it a bottom piece 9 are secured. The distance between the printed wiring board 8 and the bottom piece 9 forms an installation space 10, which partly accommodates the power strip or electronic switch gear 6 and also accommodates other electrical components 11 and 12, not shown. The distance between the printed wiring board 8 and the bottom piece 9 is attained by means of two hollow attachments 13 and 14 of the bottom piece 9, into each of which a screw 15 and 16, respectively, is inserted. With the screws, the bottom piece 9 is secured to the hood 7 and the printed wiring board 8 is clamped in place. Two hollow bottom piece attachments 17 and 18 can also be seen in the installation space 10, each of which fits protectively over a contact bush 19 and 20, respectively. It should also be noted that the bottom piece 9 has two fixation holes 21 and 22 for aligned joining together of the lid 5 and valve block 2.

The valve block 2 shown in FIG. 2 contains a number of magnet valves, of which - as already noted only the two magnet valves 3 and 4 can be seen. Each magnet valve 3 and 4 has contact elements, protruding past an upper part 23 and 24 of the valve housing, respectively, such as respective contact pins 25 and 26, which are intended to make electrical connections with other associated contact elements such as respective contact bushes 19 and 20 in the valve block lid 5. Instead of contact pins 25 and 26, contact knives produced from flat stock may also be used, if the contact elements that receive the contact knives are embodied accordingly, for instance in the form of slit bushes that receive the contact knives by a portion of the width of the knives.

At least two attachment screws 27 and 28, which have a cylindrical screw shaft 29 and 30, respectively, are anchored in the valve block 2. Two hollow cylindrical guide extensions 31 and 32 of an intermediate plate 33, which is preferably made entirely of insulating material, are slideably disposed around the screw shafts 29 and 30, and a respective compression spring 34 and 35, located between the valve block 2 and the guide extensions 31 and 32, assures that the intermediate plate 33, in the dismounted state of the valve block unit 1, will assume its maximum position in terms of height, in which it is held by the underside of screw heads 36 and 37 of the attachment screws 27 and 28. In this position of the intermediate plate 33, the contact pins 25 and 26 are each covered by one receptacle 38 or 39 of the intermediate plate 33, in such a way that they do not protrude from it and therefore cannot be bent or damaged.

As FIG. 2 also shows, the intermediate plate 33 furthermore has two fixation or alignment pins 40 and 41, which are intended to penetrate the fixation holes 21 and 22 in the valve block lid 5 and thus serve to prealign the valve block lid 5 and the valve block 2 in the installation process. The intermediate plate 33 has a lateral rim 42 that is drawn downward and extends beside a wall 43, drawn upward, of the valve block 2.

Mode of Operation

Figure 1:
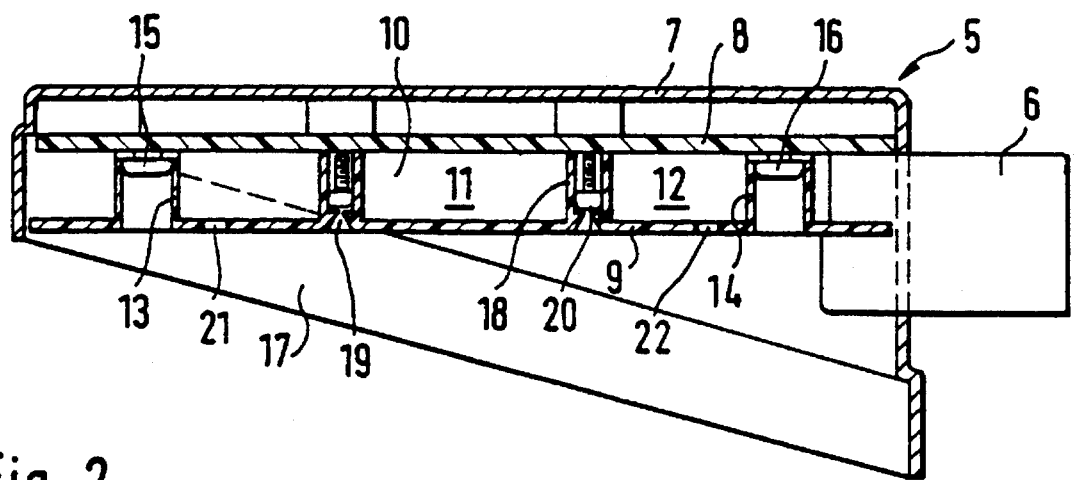
FIG. 1 is a sectional diagram of the valve block lid with switch means.

In FIGS. 1 and 2, the valve block unit is shown in the dismounted or not yet installed state. Under the force of the springs 34 and 35, the intermediate plate 33 is then in its uppermost position, in which it protectively receives the contact pins 25 and 26. This protects them against bending or other damage.

To mount the valve block lid 5 on the valve block 2, the valve block lid 5 is moved with its bottom piece 9 toward the valve block 2 in such a way that the fixation holes 21 and 22 in the bottom piece 9 find and receive the alignment pins 40 and 41. As the two parts 2 and 5 are moved closed together, the bottom piece 9 presses against the intermediate plate 33, and the valve block lid 5 then presses the intermediate plate 33 downward counter to the force of the springs 34 and 35.

The bottom piece 9 and the intermediate plate 33 are then displaced together. Finally, in this motion, the now accurately positioned contact pins 25 and 26 reach the contact bushes 19 and 20 and enter into them, making a line connection. This assures a secure connection of the electrical lines. Because of the guidance of the contact pins 25 and 26, automatic installation of the kind that is usual in mass production, is also possible without further ado. The valve block lid 5 merely needs to be placed on top and pressed downward. Funnels 44 and 45 may be provided on the intermediate plate 33 and/or on the bottom piece 9. In an alternative embodiment, it is naturally also possible for the contact pins 25 and 26 to be provided on the lid 5, and for the contact bushes 19 and 20 then to be provided on the valve block 2. However, the intermediate plate 33 must be suspended resiliently from the valve block lid 5. As already noted, contact blades or similar contact elements may also be built in instead of the contact pins.

Figure 4:
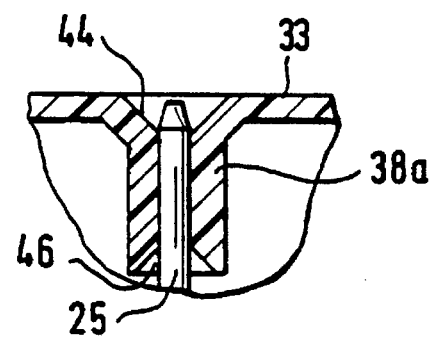
FIG. 4 shows a further feature of an individual part of FIG. 2 in section.

A further feature of receptacles located on the intermediate board 33 can be seen in FIG. 4. There, a receptacle 38a has an insertion funnel 46, which opens in the direction toward the respective magnet valve 3 or 4. Insertion funnels 46 of this kind make it easier to insert the contact pins 25, 26 when the intermediate plate 33 is mounted using the attachment screws 27, 28.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A valve block unit for brake pressure modulation systems, such as anti-lock brake or traction control systems, comprising a valve block (2), a valve block lid (5) secured on said valve block, at least one electromagnetically actuatable hydraulic valve contained in said valve block, said at least one electromagnetically actuatable hydraulic valve including at least one contact element (25, 26) for electrical connection with at least one electrical contact (19, 20) in said valve block lid, an intermediate plate (33) which is movably secured to said valve block and provided with guide openings (38, 39) for passage of said at least one contact element (25, 26) to make an electrical connection between the at least one electrical contact element (25, 26) and the at least one electrical contact element (19, 20), an electronic switchgear (6) disposed in a space between said valve block (2) and said valve block lid (5), the intermediate plate (33) is movably guided along a joining direction of the contact elements and is subject to a force of compression springs (34, 35) between said valve block (2) and said intermediate plate (33); and that the compression springs (34, 35) tend to keep the plate (33) in an outermost position in which the at least one contact element (25, 26) is received in protected fashion by the guide openings (38, 39) of the intermediate plate (33).

2. A valve block unit as defined by claim 1, in which the intermediate plate (33) is guided displaceably by screw shafts (29, 30) of a plurality of attachment screws (27, 28) by which said intermediate plate is secured to said valve block (2).

3. A valve block unit as defined by claim 1, in which in a completely mounted position of the valve block (2) and valve block lid (5), the at least one contact element (25, 26) and the at least one electrical contact element (19, 20) are plugged together.

4. A valve block unit as defined by claim 2, in which in a completely mounted position of the valve block (2) and valve block lid (5), the at least one contact element (25, 26) and the at least one electrical contact element (19, 20) are plugged together.

5. A valve block unit as defined by claim 1, in which in order to facilitate a preinstallation, the guide openings (38, 39) of the intermediate plate (33) are formed as insertion funnels (46) for the insertion of the at least one contact element (25, 26) into the guide openings.

6. A valve block unit as defined by claim 2, in which in order to facilitate a preinstallation, the guide openings (38, 39) of the intermediate plate (33) are formed as insertion funnels (46) for the insertion of the at least one contact element (25, 26) into the guide openings.

7. A valve block unit as defined by claim 3, in which in order to facilitate a preinstallation, the guide openings (38, 39) of the intermediate plate (33) are formed as insertion funnels (46) for the insertion of the at least one contact element (25, 26) into the guide openings.

8. A valve block unit as defined by claim 1, in which the intermediate plate (33) is formed of insulating material.

9. A valve block unit as defined by claim 2, in which the intermediate plate (33) is formed of insulating material.

10. A valve block unit as defined by claim 3, in which the intermediate plate (33) is formed of insulating material.

11. A valve block unit as defined by claim 5, in which the intermediate plate (33) is formed of insulating material.

12. A valve block unit as defined by claim 2, in which the at least one contact element (25, 26) is substantially pinlike and the attachment screws (27, 28) are disposed on the valve block (2) that receives the at least one electromagnetically activated valve (3, 4), and the electrical contact elements (19, 20) associated therewith are disposed on a bottom piece of the valve block lid (5).

13. A valve block unit as defined by claim 6, in which the at least one contact element (25, 26) is substantially pinlike and the attachment screws (27, 28) are disposed on the valve block (2) that receives the at least one electromagnetically activated valve (3, 4), and the electrical contact elements (19, 20) associated therewith are disposed on a bottom piece of the valve block lid (5).

14. A valve block unit as defined by claim 9, in which the at least one contact element (25, 26) is substantially pinlike and the attachment screws (27, 28) are disposed on the valve block (2) that receives the at least one electromagnetically activated valve (3, 4), and the electrical contact elements (19, 20) associated therewith are disposed on a bottom piece of the valve block lid (5).

15. A valve block unit as defined by claim 1, in which the at least one contact element (19, 20) is electrically connected to an electrical printed wiring board (8).

16. A valve block unit as defined by claim 2, in which the at least one contact element (19, 20) is electrically connected to an electrical printed wiring board (8).

17. A valve block unit as defined by claim 15, in which at least one electrical component (11, 12) is electrically connected to the electrical printed wiring board (8).

* * * * *